United States Patent Office 2,797,185
Patented June 25, 1957

2,797,185

OLEAGINOUS VITAGEN PREPARATION

Giraud W. Campbell, Lynbrook, N. Y.

No Drawing. Application January 14, 1954,
Serial No. 404,125

3 Claims. (Cl. 167—81)

This invention relates to vitamin-containing food products, and more particularly to vitagens which combine the functions of vitamins with those of basic food substances, such as proteins, carbohydrates and fats. Vitamins, as is well known, are essential for growth and maintenance of life. The vitagens of this invention not only supply these functions of vitamins, but also supply energy and act as structural building units.

It is among the objects of this invention to provide a novel vitamin-containing food product which is beneficial from both a nutritional and health standpoint.

Other objects and advantages of this invention will be apparent from the following detailed description thereof.

Vitagens embodying this invention are composed of 2 to 5, preferably 4, parts by weight of fish liver oil, 2 to 5, preferably 4, parts by weight of butter oil, and 1 to 4, preferably 3, parts by weight of rice bran oil. Per unit dose, e. g., capsule or other form in which the vitagens may be administered, the vitagen may contain from 2 to 5, preferably 4, mg. (milligrams) of fish liver oil, from 2 to 5, preferably 4, mg. of butter oil and from 1 to 4, preferably 3, mg. of rice bran oil. Thus, each unit does, e. g., capsule, etc., may consist of from 10 to 12 mg.

The fish liver oil employed may be any fish liver oil containing from 350 to 650, preferably about 500, U. S. P. units of vitamin A per mg. and from about 25 to 75, preferably about 50, U. S. P. units of vitamin D per mg. Throughout this specification and claims the vitamin content will be expressed in standard U. S. P. units. The amount of fish liver oil used in making the vitagen of this invention will therefore be such as to provide per unit dose from about 1500 to about 2500, preferably about 2000, units of vitamin A and from about 100 to about 300, preferably about 200, units of vitamin D. Examples of fish liver oils which may be employed are halibut, shark liver oil, whale oil, swordfish oil, tuna including blue fin tuna, dolphin, herring, black sea bass, salmon and cod liver oil. Of these fish liver oils, halibut, shark liver oil, whale oil, swordfish oil, tuna and dolphin are of high potency with respect to their vitamin A content, i. e., contain relatively high contents of vitamin A, usually from about 30,000 to about 50,000 units per gram. Cod liver oil is of lower potency and contains of the order of 2000 units of vitamin A per gram.

Blue fin tuna has a relatively high vitamin D content of the order of 40,000 units per gram. Swordfish oil usually contains about 10,000 units of vitamin D per gram, black sea bass about 5000, Chinook salmon about 1300, halibut about 1200, herring about 100 and cod about 100 units of vitamin D per gram. One or a mixture of two or more different fish liver oils may be used in concentrated form so that the resultant fish liver oil or mixture thereof contains, per unit dose of from about 10 to about 12 mg., from about 1500 to about 2500, preferably about 2000, units of vitamin A and from about 100 to about 300, preferably about 200, units of vitamin D. It will be understood that the expression "fish liver oil" is used in the claims to include a single fish liver oil as well as a mixture of two or more fish liver oils.

In addition to the vitamins A and D the fish liver oil contains fatty acid fractions, both saturated and unsaturated, containing from 12 to 22 carbon atoms. It is important that the fish liver oil contain docasahexanoic acid.

Any butter oil of commerce may be used which contains 2000 to 20,000 units of vitamin A per pound. These butter oils contain fatty acids, both saturated and unsaturated, in the 12 to 22 carbon atom range, which fatty acids differ chemically and in their biological effect from those present in the fish liver oil.

The rice bran oil contains tocopherols (vitamin E) in amount from 0.01 to 8 mg. per gram. It also contains both saturated and unsaturated fatty acids having from 4 to 22 carbon atoms. The rice bran oil contributes to the vitagen the beneficial factors of vegetable oils, whereas the fish liver oil and the butter oil contribute the beneficial factors of mammalian oils. Furthermore, the presence of the rice bran oil minimizes oxidation of the unsaturated fatty acids, particularly those present in the mammalian oils. A crude rice bran oil is preferred, although any rice bran oil containing the tocopherol content above noted may be employed.

In the preparation of vitagens of this invention, the fish liver oil desirably at room temperature (about 70° F.) is mixed with the butter oil and the mixture heated to 100° to 180° F., preferably 110° F., to produce a homogeneous solution. The rice bran oil is then added to this mixture while agitating and maintaining the mixture at a temperature within the range of 100° to 180° F., preferably about 110° F. If desired the order of addition of the constituents may be changed; a satisfactory vitagen is produced irrespective of the order in which the constituents are mixed. The resultant liquid is then encapsulated employing gelatin or any other suitable medium for the formation of the capsules. The encapsulation prevents oxidation and permits maintenance of the vitagens in storage for long periods of time. If the vitagens are to be used within three months of their formation they need not be encapsulated. Furthermore, it will be understood that instead of encapsulating the vitagens they may be sealed in dark bottles which are maintained in a refrigerated condition until used, or may be placed in sealed vials, etc. Upon cooling to room temperature the liquid material separates into a plurality of phases, which, however, do not interfere with the potency of the mixture. If the liquid mixture is placed in bottles or vials, before use the material should be shaken or heated to get a uniform emulsion.

The individual components have certain beneficial properties when digested. Surprisingly, however, the mixture of the fish liver oil, butter oil and rice bran oil having the characteristics and in the proportions above noted give results which could not have been predicted or expected from the known beneficial effects of the individual components. That is to say, from the results obtained by the use of the vitagens of this invention it is evident that either the rice bran oil, or the butter oil, or the fish liver oil act synergistically with one or the other two components.

The vitagens of this invention, i. e., the mixture of the fish liver oil, butter oil and rice bran oil of the character and in the proportions above noted, give the following beneficial results:

1. Results in improvement in appetite and weight gain;
2. Normalizes blood calcium levels; and
3. Relieves idiopathic dysmenorrhea (painful menstrual periods of unknown origin).

The following examples are given for purposes of illustration only and it will be understood the invention is not limited to these examples.

*Example I*

Each capsule or unit dose contained 4 mg. of halibut fish liver oil providing 1750 units of vitamin A and 170 units of vitamin D, 4 mg. of butter oil containing 18,000 units of vitamin A per pound and 3 mg. of rice bran oil containing 2 mg. of tocopherol per gram.

*Example II*

Each capsule contained 3 mg. of fish liver oil (shark oil) providing 2000 units of vitamin A and 200 units of vitamin D, 5 mg. of butter oil containing 15,000 units of vitamin A per pound, and 4 mg. of rice bran oil containing 1.5 mg. of tocopherol per gram.

*Example III*

Each capsule contained 5 mg. of cod liver oil providing 750 units of vitamin A and 75 units of vitamin D, 3 mg. of butter oil containing 20,000 units of vitamin A per pound, and 3 mg. of rice bran oil containing 5 mg. of tocopherol per gram.

BLOOD CALCIUM TEST

The vitagen of Example I was administered to 25 patients, 1 capsule after each meal (3 a day) for 5 weeks. The blood of each patient was analyzed before and after the test. Initially the patients showed an average calcium of about 7.5 mg. per 100 cc., some of the patients showed a calcium content as low as 5 mg. per 100 cc. In every case the calcium content of the blood was normalized, i. e., reached and remain at 9.8 mg. per 100 cc. of blood at the end of the test period.

Since certain changes may be made in vitagens and in the manner of producing them, without departing from the scope of the invention, it is intended that all matter contained in the above description shall be interpreted as illustrative and not in a limiting sense.

What is claimed is:

1. A vitamin-containing food product containing as its essential constituents from 2 to 5 parts by weight of fish liver oil, 2 to 5 parts by weight of butter oil, and 1 to 4 parts by weight of rice bran oil.

2. A vitamin-containing food product containing as its essential constituents about 4 parts by weight of fish liver oil containing vitamins A and D and fatty acids having from 12 to 22 carbon atoms including docasahexanoic acid, about 4 parts by weight of butter oil containing from 2000 to 20,000 units of vitamin A per pound, and fatty acids having from 12 to 22 carbon atoms, and about 3 parts by weight of rice bran oil containing from 0.01 to 8 mg. of tocopherol per gram of rice bran oil.

3. A vitamin capsule consisting of about 4 mg. of fish liver oil containing about 1750 units of vitamin A and about 120 units of vitamin D and also containing docasahexanoic acid, about 4 mg. of butter oil containing about 18,000 units of vitamin A per pound and about 3 mg. of rice bran oil containing about 2 mg. of tocopherol per gram.

References Cited in the file of this patent

UNITED STATES PATENTS 2,300,410     Ferrari _____ Nov. 3, 1942

OTHER REFERENCES

Modern Drug Encyclopedia, 4th ed., 1949, p. 126.

Ueno, J. of the Soc. of Chem. Ind., Japan, vol. 40, June 1937, pp. 200–202.

U. S. Dispensatory, 24th ed., 1947, pp. 309–312.

Feuge: Chem. Abstrs., vol. 43, p. 6842.

Fisher, Ind. and Eng. Chem., Analytical Ed., vol. 17, 1945, pp. 224–7.